(12) United States Patent
Thomas et al.

(10) Patent No.: US 9,944,394 B2
(45) Date of Patent: Apr. 17, 2018

(54) BELLY-MOUNTED LOAD BEAM FOR AN AERIAL VEHICLE

(71) Applicant: Boost Human External Cargo Systems Inc., North Vancouver (CA)

(72) Inventors: Derek Thomas, North Vancouver (CA); Jeff Yarnold, North Vancouver (CA)

(73) Assignee: Boost Human External Cargo Systems Inc., North Vancouver (CA)

( * ) Notice: Subject to any disclaimer, the term of this patent is extended or adjusted under 35 U.S.C. 154(b) by 0 days.

(21) Appl. No.: 14/625,624

(22) Filed: Feb. 18, 2015

(65) Prior Publication Data

US 2016/0236779 A1    Aug. 18, 2016

(51) Int. Cl.
*B64D 1/22*    (2006.01)
(52) U.S. Cl.
CPC ..................... *B64D 1/22* (2013.01)
(58) Field of Classification Search
CPC ... B64D 1/22; B64D 3/00; B64D 3/02; B64D 5/00
See application file for complete search history.

(56) References Cited

U.S. PATENT DOCUMENTS

| 4,138,078 A * | 2/1979 | Hester ..................... B64D 9/00 244/137.4 |
| 4,984,757 A * | 1/1991 | Hartung ............... A01G 23/095 144/24.13 |
| 8,888,048 B2 * | 11/2014 | Figoureux ................ B64D 1/22 244/118.1 |
| 2014/0252170 A1 * | 9/2014 | Prud'Homme-Lacroix B64C 7/00 244/121 |

* cited by examiner

*Primary Examiner* — Brian M O'Hara
(74) *Attorney, Agent, or Firm* — Cameron IP

(57) ABSTRACT

A load beam for an aerial vehicle comprises an elongate beam with a radial slot and a lug extending from the radial slot. A hook is pivotably connected to the lug. There is a first arm pivotably connected to the beam and a second arm pivotably connected to the beam. The first arm may be pivotably connected to a first mount and the second arm may be pivotably connected to a second mount. A pivot axis of the first arm relative to the elongate beam may be substantially parallel to a pivot axis of the first arm relative to the first mount. A pivot axis of the second arm relative to the elongate beam may substantially parallel to a pivot axis of the second arm relative to the second mount.

14 Claims, 4 Drawing Sheets

BELLY-MOUNTED LOAD BEAM FOR AN AERIAL VEHICLE

BACKGROUND OF THE INVENTION

Field of the Invention

The present invention relates to a load beam, and in particular, to a belly-mounted load beam for an aerial vehicle.

Description of the Related Art

U.S. Pat. No. 8,888,048, which issued on Nov. 18, 2014 to Figoureux et al., discloses a fastener device provided with attachment means for attaching an external load and with fastener means for fastening the attachment means to a load-carrier structure of an aircraft. The fastener means are provided with a support beam and anchor means for anchoring the support beam. A first mechanical coupling connects the support beam to the anchor means so as to enable the support beam to pivot about a first pivot axis. In addition, coupling means are hinged to the support beam so as to make pivoting possible about a second pivot axis. The attachment means are hinged to the coupling means to make pivoting possible about a third pivot axis. The fastener device also includes automatic folding means.

SUMMARY OF THE INVENTION

There is provided a load beam for an aerial vehicle. The load beam comprises an elongate beam with a radial slot and a lug extending from the radial slot. A hook is pivotably connected to the lug. There is a first arm pivotably connected to the elongate beam and a second arm pivotably connected to the elongate beam.

The radial slot may extend through the elongate beam and the lug may be bolted to the elongate beam. The first arm and the second arm may be pivotably connected to opposite ends of the elongate beam. The first arm and the second arm may be pivotably connected to respective clevises at opposite ends of the elongate beam and the elongate beam may taper towards the opposite ends thereof. The first arm and the second arm may each be provided with a respective clevis that receives an opposite end of the elongate beam.

The first arm may be pivotably connected to a first mount and the second arm may be pivotably connected to a second mount. A pivot axis of the first arm relative to the elongate beam may be substantially parallel to a pivot axis of the first arm relative to the first mount. A pivot axis of the second arm relative to the elongate beam may be substantially parallel to a pivot axis of the second arm relative to the second mount. The first mount may be configured to be pivotably mounted so as to pivot about an axis substantially perpendicular to the pivot axis of the first arm relative to the elongate beam and substantially perpendicular to the pivot axis of the first arm relative to the first mount. The second mount may be configured to be pivotably mounted so as to pivot about an axis substantially perpendicular to the pivot axis of the second arm relative to the elongate beam and substantially perpendicular to the pivot axis of the second arm relative to the second mount.

There is also provided an aerial vehicle provided with a load beam. The load beam comprises an elongate beam with a radial slot and a lug extending from the radial slot. A hook is pivotably connected to the lug. There is a first arm pivotably connected to the elongate beam and a second arm pivotably connected to the elongate beam. The first arm is pivotably connected to a first mount and the second arm is pivotably connected to a second mount. A pivot axis of the first arm relative to the elongate beam is substantially parallel to a pivot axis of the first arm relative to the first mount. A pivot axis of the second arm relative to the elongate beam is substantially parallel to a pivot axis of the second 
arm relative to the second mount. The first mount is mounted to the aerial vehicle so as to pivot about an axis substantially perpendicular to the pivot axis of the first arm relative to the elongate beam and substantially perpendicular to the pivot axis of the first arm relative to the first mount. The second mount is mounted to the aerial vehicle so as to pivot about an axis substantially perpendicular to the pivot axis of the second arm relative to the elongate beam and substantially perpendicular to the pivot axis of the second arm relative to the second mount. The first mount may be pivotably mounted to the aerial vehicle at a first mounting bracket and the second mount may be pivotably mounted to the aerial vehicle at a second mounting bracket.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
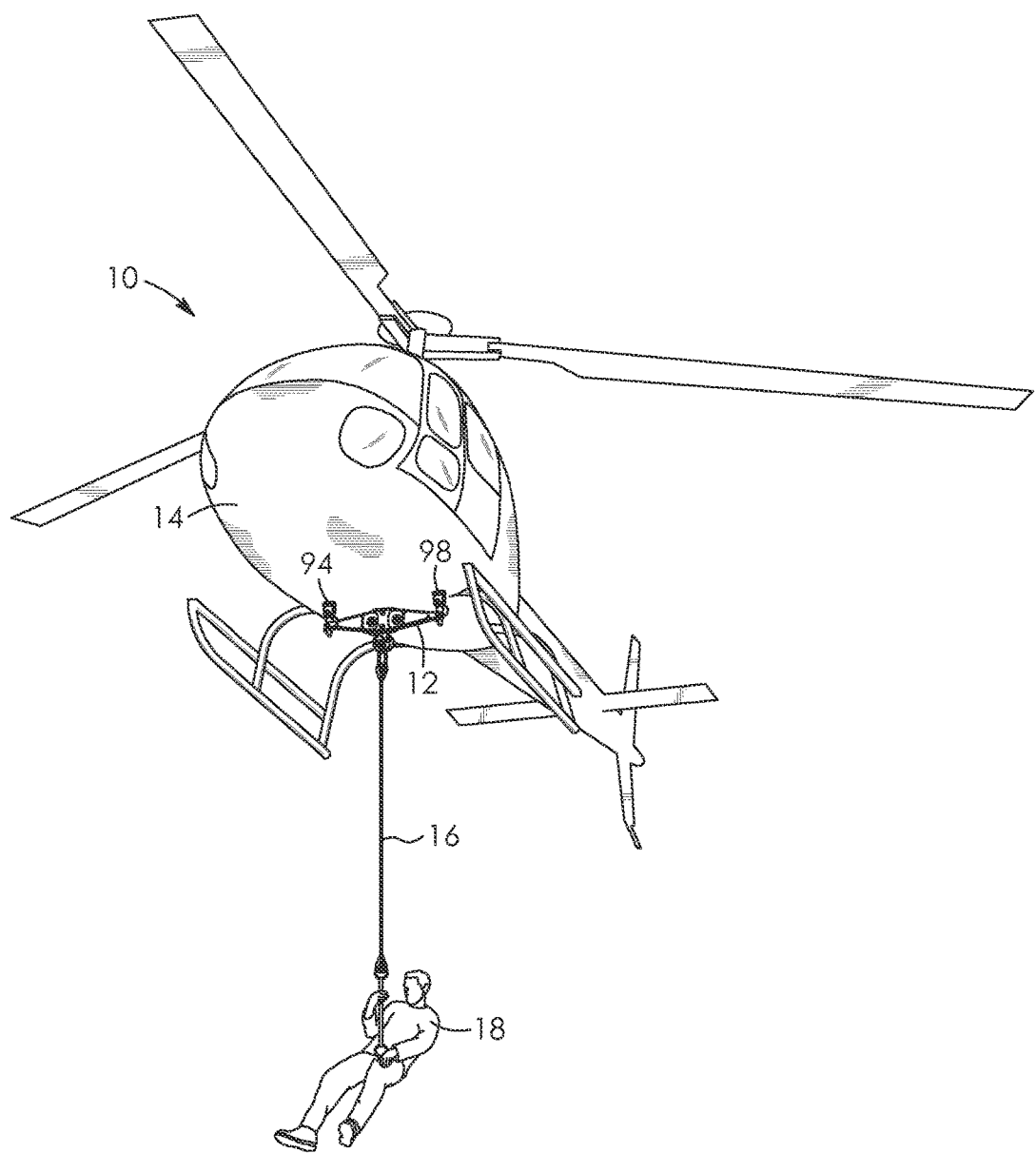
FIG. 1 is a perspective view showing an aerial vehicle provided with a belly-mounted load beam.

Referring to the drawings and first to FIG. 1, an aerial vehicle 10 which is provided with a load beam 12 is shown. The load beam 12 is a belly-mounted load beam and is mounted on a belly 14 of the aerial vehicle 10. There is a tether 16 connected to the load beam 12. The tether 16 is also connected to a load 18 which is being airlifted by the aerial vehicle 10. In this example, the aerial vehicle 10 is a helicopter and the load 18 is a person. However, it will be understood by a person skilled in the art that the aerial vehicle 10 may be any appropriate aerial vehicle and the load 18 may be any appropriate load. The load beam 12 is shown in greater detail in FIG. 2 and includes an elongate beam 20. There is a first arm 22 and a second arm 24 which are each pivotably connected to opposite ends of the elongate beam 20.

The first arm 22 and the second arm 24 are each also pivotably connected to a corresponding first mount 26 and second mount 28. The first arm 22 is pivotable about a first axis 110 and a second axis 120. The first axis 110 is a pivot axis of the first arm 22 relative to the elongate beam 20 and the second axis 120 is a pivot axis of the first arm 22 relative to the first mount 26. The first axis 110 and the second axis 120 are substantially parallel to one another. The second arm 24 is pivotable about a third axis 130 and a fourth axis 140. The third axis 130 is a pivot axis of the second arm 24 relative to the elongate beam 20 and the fourth axis 140 is a pivot axis of the second arm 24 relative to the second mount 28. The third axis 130 and the fourth axis 140 are substantially parallel to one another.

There is a hook 30 pivotable about a fifth axis 150 which, in this example, is substantially parallel with the first axis 110, the second axis 120, the third axis 130 and the fourth axis 140. The hook 30 is provided with a conventional locking mechanism 32. In this example, the elongate beam 20 is substantially symmetrical and tapers towards the ends thereof. This provides the first arm 22 and the second arm 24 with an increased range of motion when respectively pivoting about the first axis 110 and the third axis 130. There is also a plurality of recesses 34, 36, 38 and 40 disposed along the elongate beam 20.

Figure 2:
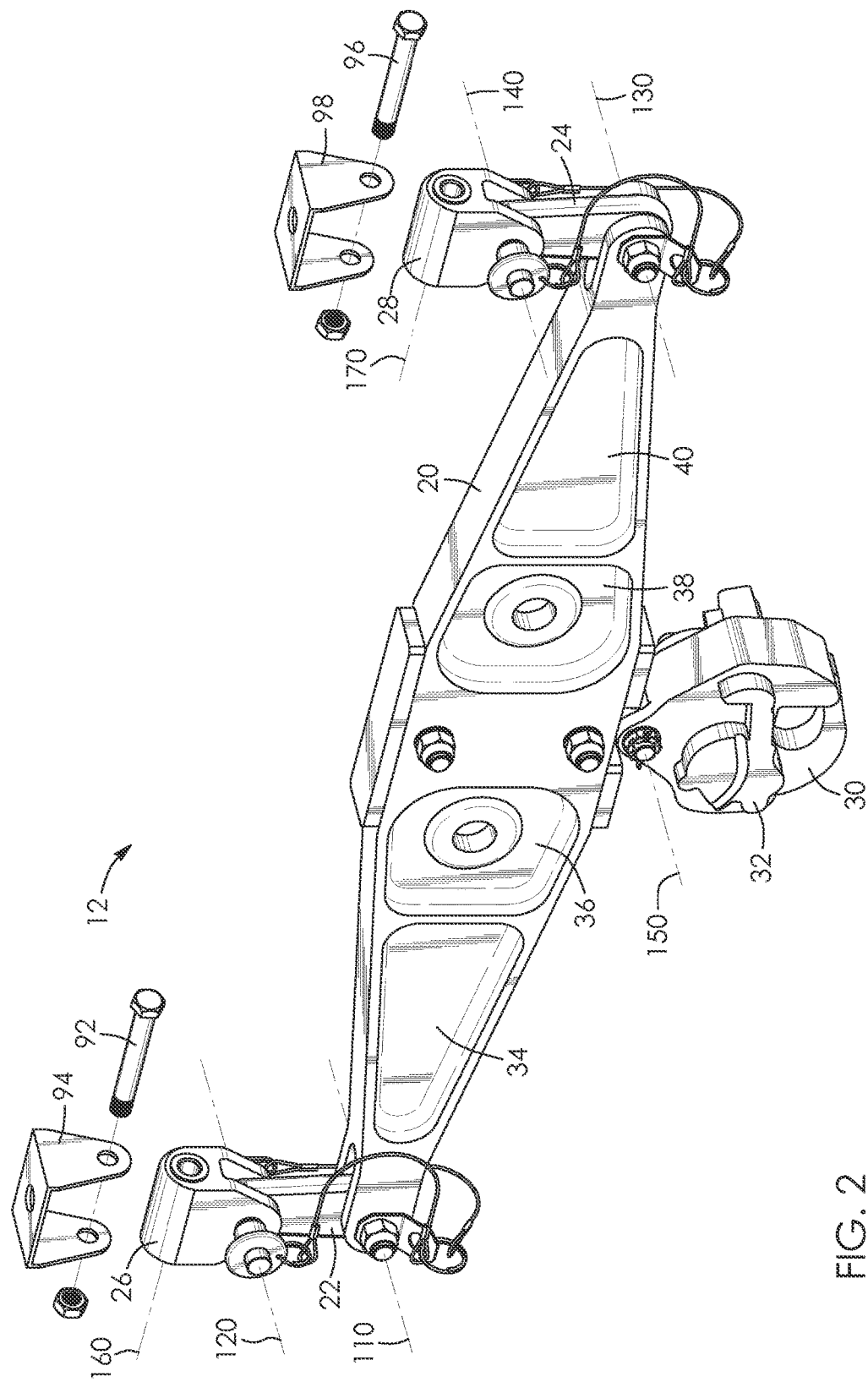
FIG. 2 is a perspective view of the belly-mounted load beam of FIG. 1.
Figure 3:
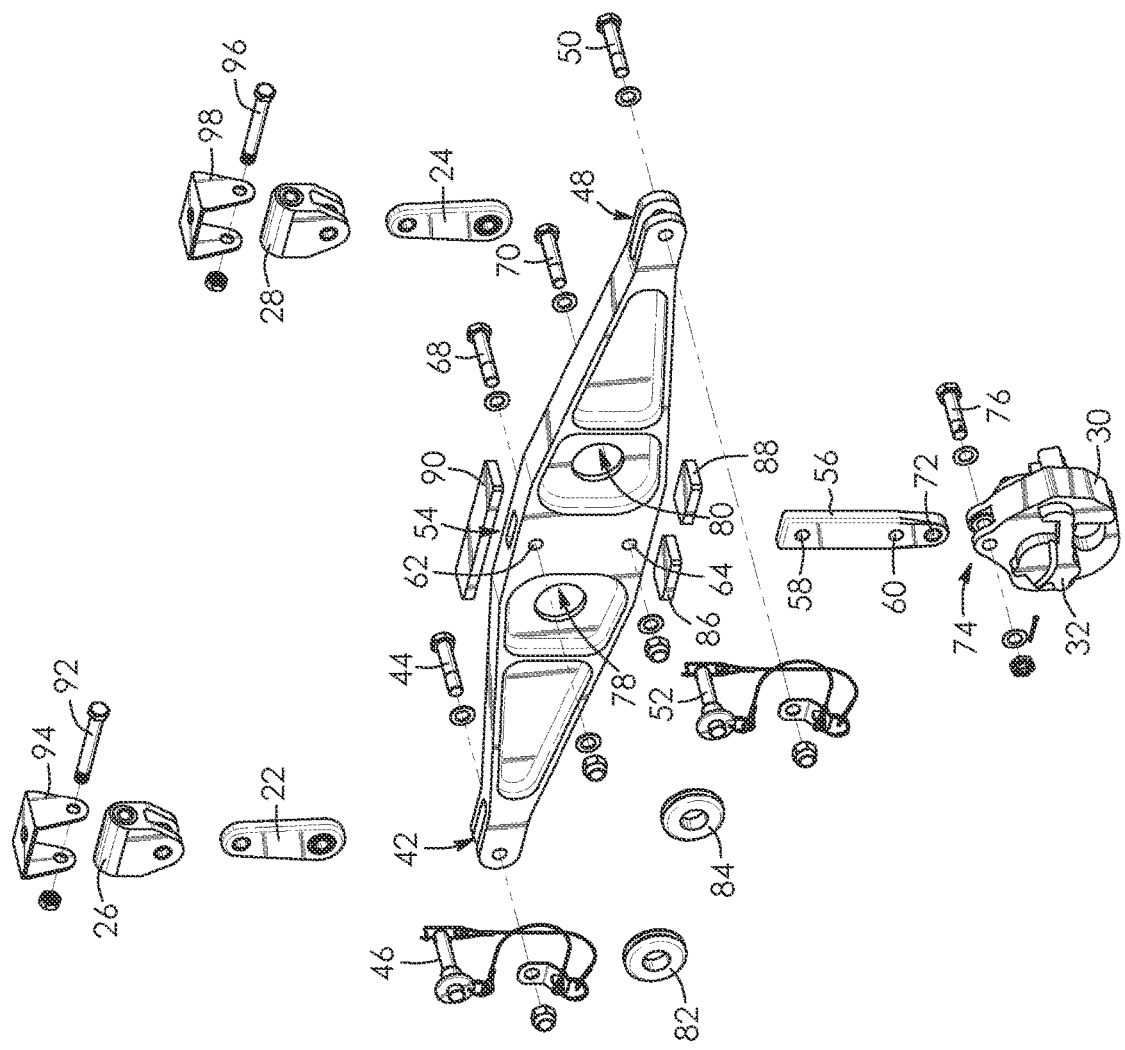
FIG. 3 is a perspective, exploded view of the belly-mounted load beam of FIG. 1.

Referring now to FIG. 3, the first arm 22 is received by a first clevis 42 of the elongate beam 20 and is pivotable about a pivot pin 44. The first arm 22 is also received by a clevis of the first mount 26 and is pivotable about a pivot pin 46. The second arm 24 is received by a second clevis 48 of the elongate beam 20 and is pivotable about a pivot pin 50. The second arm 24 is also received by a clevis of the second mount 28 and is pivotable about a pivot pin 52. There is a radial slot 54 in the elongate beam 20 which receives a lug 56. There are through holes 58 and 60 in the lug 56 which are spaced so as to align with through holes 62 and 64 in the elongate beam 20. This allows bolts 68 and 70 to couple the lug 56 to the elongate beam 20. There is a further through hole 72 in the lug 56 that allows the lug to be coupled to a clevis 74 of the hook 30 by a pivot pin 76. With reference to FIG. 2, the aforementioned pivot pins allow the relative pivoting of the first arm 22 about the first axis 110 and the second axis 120, relative pivoting of the second arm 24 about the third axis 130 and the fourth axis 140, and relative pivoting of the hook 30 about the fifth axis 150. Referring back to FIG. 3, there are also through holes 78 and 80 in the elongate beam 20. The through holes 78 and 80 each receive a corresponding one of O-shaped inserts 82 and 84 or grommets. There are also bumpers 86, 88 and 90, which may be foam, disposed along the elongate beam 20.

In operation, and with reference to FIGS. 1 to 3, the first mount 26 is coupled by a pivot pin 92 to a mounting bracket 94 disposed on the belly 14 of the aerial vehicle 10. The second mount 28 is likewise coupled by a pivot pin 96 to a mounting bracket 98 disposed on the belly 14 of the aerial vehicle 10. The first mount 26 is pivotable about a sixth axis 160 and the second mount 28 is pivotable about a seventh axis 170. The sixth axis 160 and the seventh axis 170 are substantially perpendicular to each of the first axis 110, the second axis 120, the third axis 130, the fourth axis 140, and the fifth axis 150. The sixth axis 160 and the seventh axis 170 may be substantially parallel to one another and, in some examples, substantially coaxial. Relative pivoting of the structural components of the load beam 12 allows for balancing of a load being airlifted.

Figure 4:
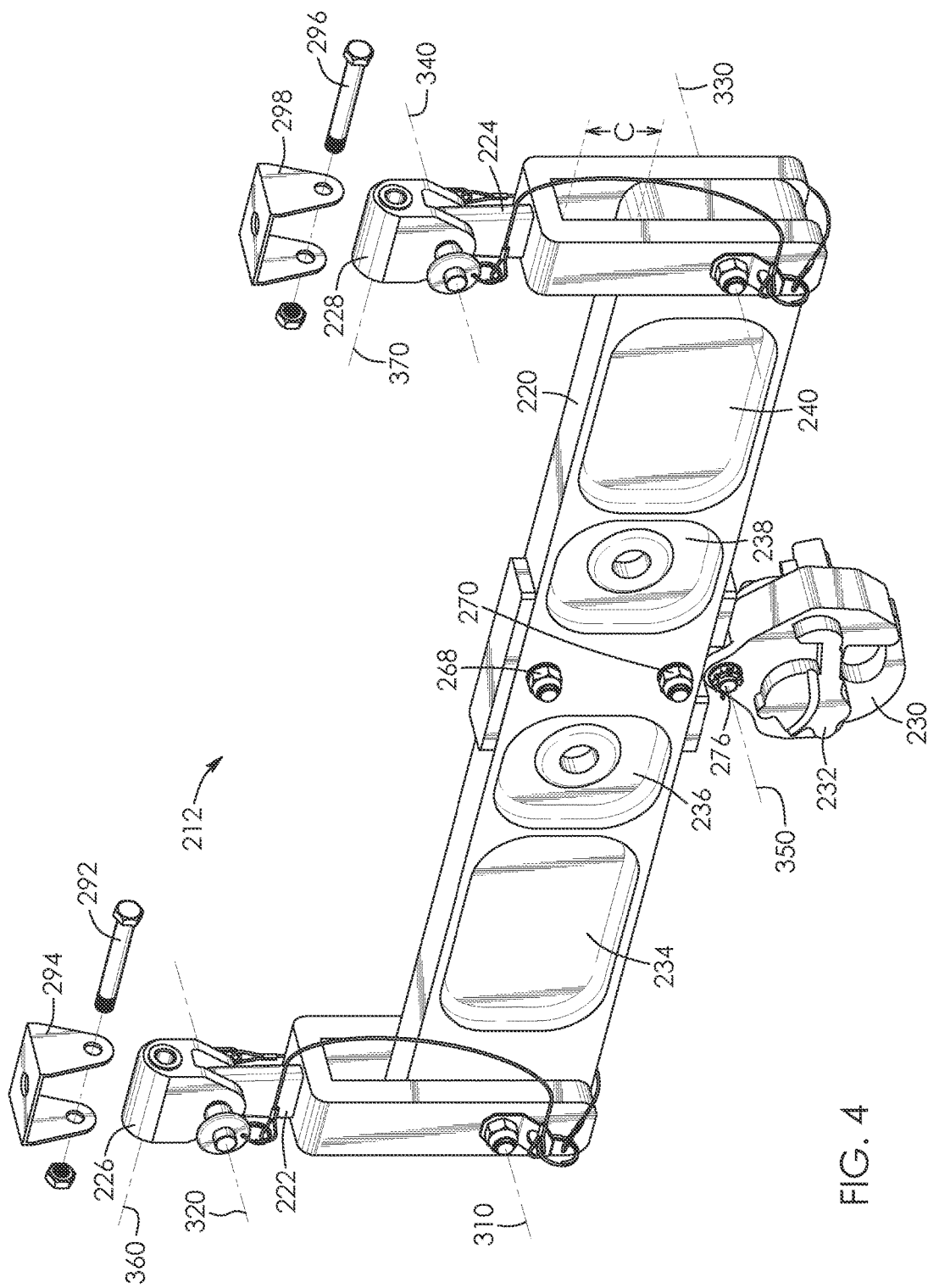
FIG. 4 is a perspective view of another belly-mounted load beam.

FIG. 4 shows another load beam 212 which may be mounted to a belly of an aerial vehicle. The load beam 212 includes an elongate beam 220 with a first arm 222 and a second arm 224 each pivotably connected to opposite ends of the elongate beam 220. The elongate beam 220 is received by respective clevises of the first arm 222 and the second arm 224. The first arm 222 and the second arm 224 are each also pivotably connected to a corresponding first mount 226 and second mount 228.

The first arm 222 is pivotable relative to the elongate beam 220 about a first axis 310 and the first arm 222 is pivotable relative to the first mount 226 about a second axis 320. The first axis 310 and the second axis 320 are substantially parallel to one another. The second arm 224 is pivotable relative to the elongate beam 220 about a third axis 330 and the second arm 224 is pivotable relative to the second mount 228 about a fourth axis 340. The third axis 330 and the fourth axis 340 are substantially parallel to one another.

There is a hook 230 pivotable about a fifth axis 350 which, in this example, is substantially parallel with the first axis 310, the second axis 320, the third axis 330 and the fourth axis 340. The hook 230 is provided with a conventional locking mechanism 232. The hook 230 is coupled to a lug (not shown) by a pivot pin 276. The lug is received by a radial slot (not shown) in the elongate beam 220 and bolted to the elongate beam by bolts 268 and 270 as described above for the load beam 12.

In this example, the elongate beam 220 is substantially symmetrical and does not taper towards the ends thereof. However, the first arm 222 and the second arm 224 are provided with a clearance C, as shown for the second arm 224, which allows an increased range of motion when respectively pivoting about the first axis 310 and the third axis 330. There is also a plurality of recesses 234, 236, 238 and 240 disposed along the elongate beam 220.

In operation, the first mount 226 is coupled by a pivot pin 292 to a mounting bracket 294 disposed on the belly of the aerial vehicle. The second mount 228 is likewise coupled by a pivot pin 296 to a mounting bracket 298 disposed on the belly of the aerial vehicle. The first mount 226 is pivotable about a sixth axis 360 and the second mount 228 is pivotable about a seventh axis 370. The sixth axis 360 and the seventh axis 370 are substantially perpendicular to each of the first axis 310, the second axis 320, the third axis 330, the fourth axis 340, and the fifth axis 350. The sixth axis 360 and the seventh axis 370 may be substantially parallel to one another and, in some examples, substantially coaxial. Relative pivoting of the structural components of the load beam 212 allows for balancing of a load being airlifted.

It will be understood by a person skilled in the art that many of the details provided above are by way of example only, and are not intended to limit the scope of the invention which is to be determined with reference to the following claims.

What is claimed is:

1. A load beam for an aerial vehicle, the load beam comprising:
    an elongate beam having a radial slot;
    a lug extending from the radial slot;
    a bolt extending through the elongate beam and through the lug to couple the lug to the elongate beam;
    a hook pivotably connected to the lug;
    a first arm pivotably connected to the elongate beam; and
    a second arm pivotably connected to the elongate beam, wherein the first arm and the second arm are configured to be mounted on an exterior of a fuselage of the aerial vehicle.

2. The load beam as claimed in claim 1 wherein the radial slot extends through the elongate beam.

3. The load beam as claimed in claim 1 wherein the first arm and the second arm are pivotably connected to opposite ends of the elongate beam.

4. The load beam as claimed in claim 1 wherein the first arm and the second arm are pivotably connected to respective clevises at opposite ends of the elongate beam and the elongate beam tapers towards the opposite ends thereof.

5. The load beam as claimed in claim 1 wherein the first arm and the second arm are each provided with a respective clevis that receives an opposite end of the elongate beam.

6. The load beam as claimed in claim 1 wherein the first arm is pivotably connected to a first mount and the second arm is pivotably connected to a second mount.

7. The load beam as claimed in claim 6 wherein a pivot axis of the first arm relative to the elongate beam is substantially parallel to a pivot axis of the first arm relative to the first mount, and a pivot axis of the second arm relative to the elongate beam is substantially parallel to a pivot axis of the second arm relative to the second mount.

8. The load beam as claimed in claim 7 wherein the first mount is configured to be pivotably mounted so as to pivot about an axis substantially perpendicular to the pivot axis of the first arm relative to the elongate beam and substantially perpendicular to the pivot axis of the first arm relative to the first mount, and wherein the second mount is configured to be pivotably mounted so as to pivot about an axis substantially perpendicular to the pivot axis of the second arm relative to the elongate beam and substantially perpendicular to the pivot axis of the second arm relative to the second mount.

9. An aerial vehicle provided with a load beam, the load beam comprising:
   an elongate beam having a radial slot;
   a lug extending from the radial slot;
   a bolt extending through the elongate beam and through the lug to couple the lug to the elongate beam;
   a hook pivotably connected to the lug;
   a first arm and a first mount, the first arm being pivotably connected to the elongate beam and the first arm being pivotably connected to the first mount, and a pivot axis of the first arm relative to the elongate beam being substantially parallel to a pivot axis of the first arm relative to the first mount; and
   a second arm and a second mount, the second arm being pivotably connected to the elongate beam and the second arm being pivotably connected to the second mount, and a pivot axis of the second arm relative to the elongate beam being substantially parallel to a pivot axis of the second arm relative to the second mount;
   wherein the first mount is pivotably mounted to an exterior of a fuselage of the aerial vehicle so as to pivot about an axis substantially perpendicular to the pivot axis of the first arm relative to the elongate beam and substantially perpendicular to the pivot axis of the first arm relative to the first mount, and wherein the second mount is pivotably mounted to the exterior of the fuselage of the aerial vehicle so as to pivot about an axis substantially perpendicular to the pivot axis of the second arm relative to the elongate beam and substantially perpendicular to the pivot axis of the second arm relative to the second mount.

10. The aerial vehicle as claimed in claim 9 wherein the radial slot extends through the elongate beam.

11. The aerial vehicle as claimed in claim 9 wherein the first arm and the second arm are pivotably connected to opposite ends of the elongate beam.

12. The aerial vehicle as claimed in claim 9 wherein the first arm and the second arm are pivotably connected to respective devises at opposite ends of the elongate beam and the elongate beam tapers towards the opposite ends thereof.

13. The aerial vehicle as claimed in claim 9 wherein the first arm and the second arm are each provided with a respective clevis that receives an opposite end of the elongate beam.

14. The aerial vehicle as claimed in claim 9 wherein the first mount is pivotably mounted to the aerial vehicle at a first mounting bracket and the second mount is pivotably mounted to the aerial vehicle at a second mounting bracket.

* * * * *